Patented Feb. 26, 1946

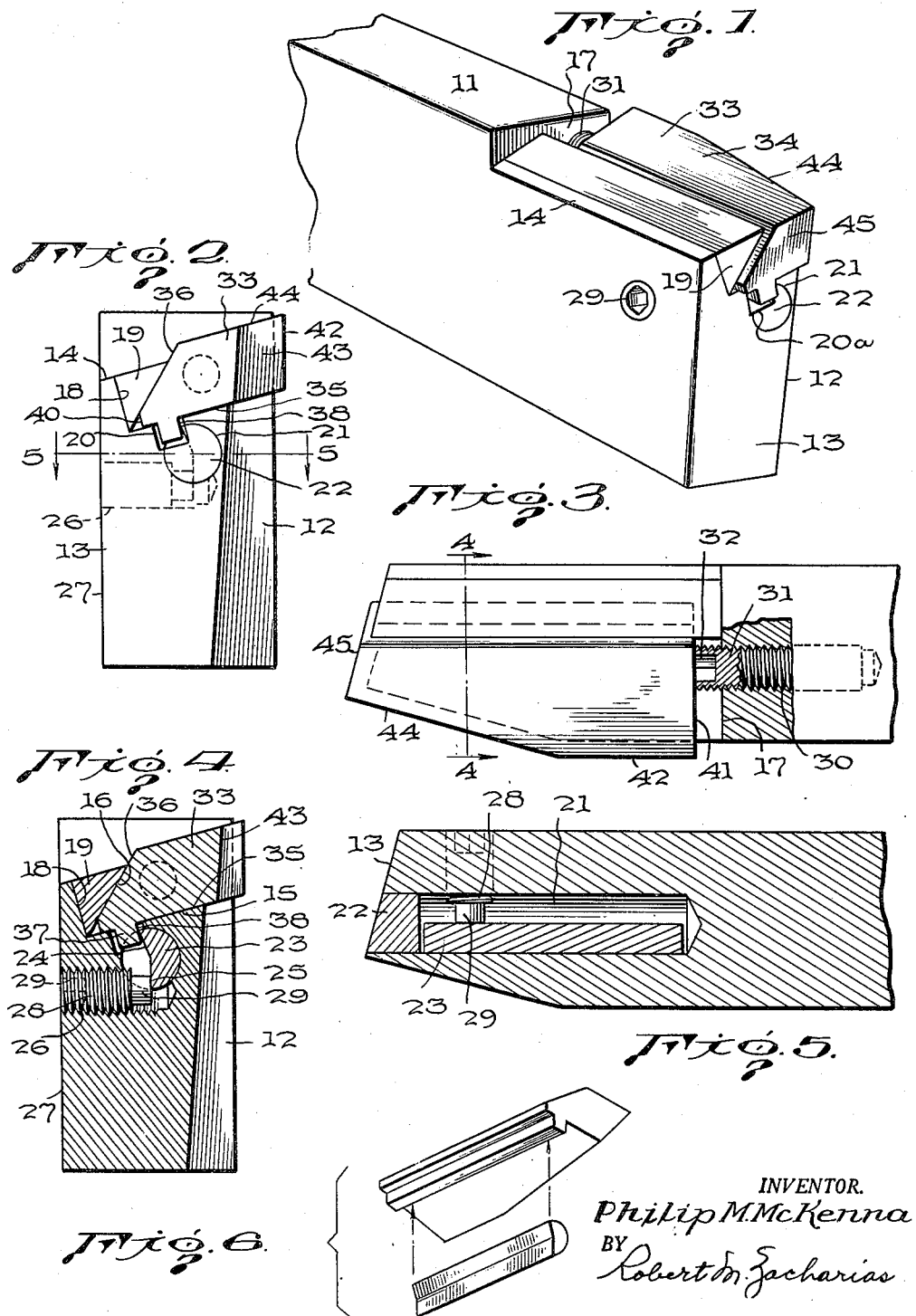

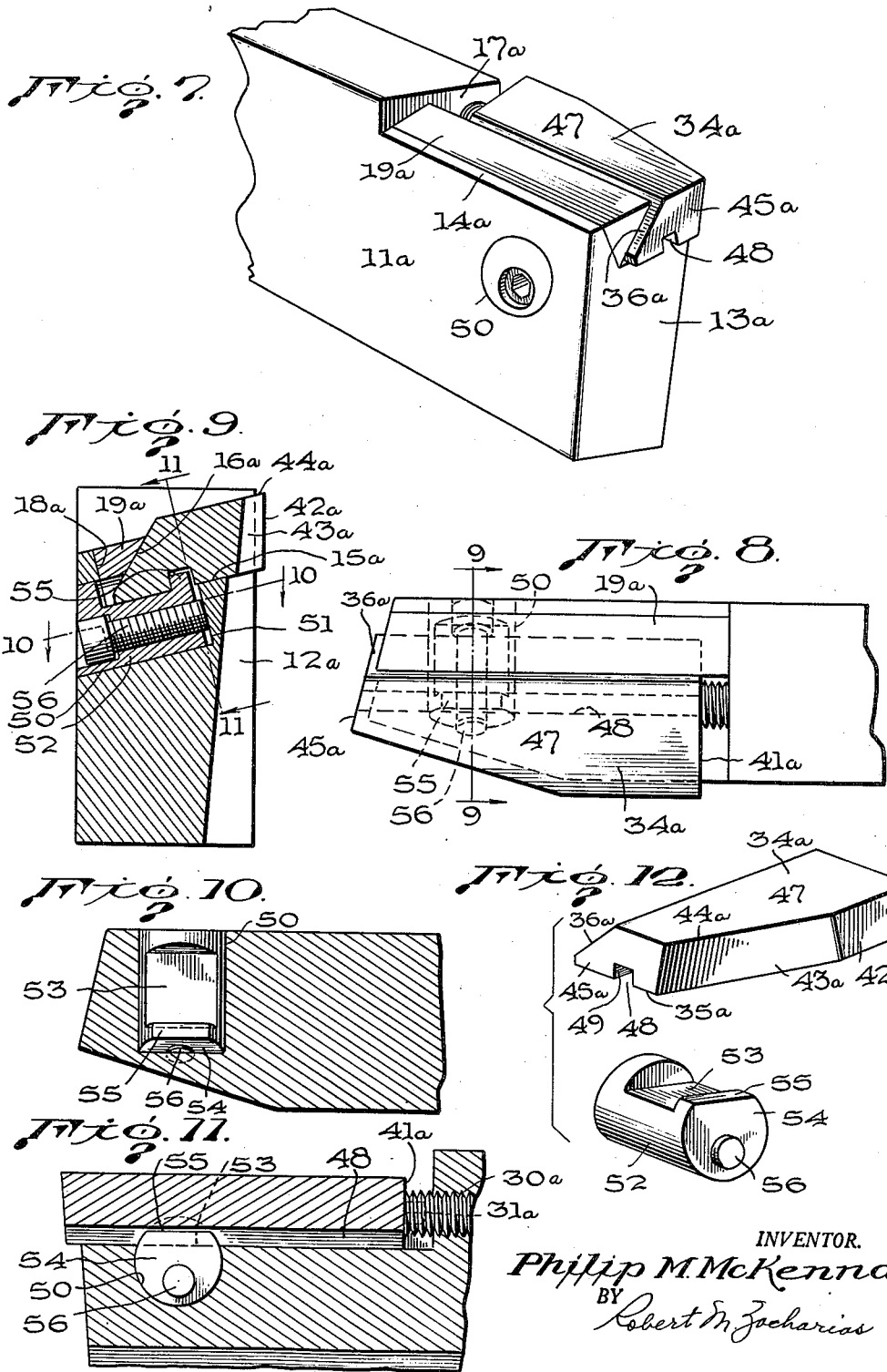

2,395,570

UNITED STATES PATENT OFFICE 2,395,570

CUTTING TOOL

Philip M. McKenna, Unity Township, Westmoreland County, Pa., assignor to Kennametal Inc., Latrobe, Pa., a corporation of Pennsylvania Application July 7, 1943, Serial No. 493,773

11 Claims. (Cl. 29—96)

This invention relates to cutting blanks and tools, and more particularly to cutting members or tips formed of cemented carbide composition or the like, and the combination of such a tip and a base to which such tip is detachably secured.

One of the objects of the invention is to provide means for detachably securing a tip in place upon the base, which means is operable from a side of the base or shank remote from the cutting edge of the tip and hence not subject to injury by, or interference with movement of, the chips.

Other objects of the invention are to provide such a securing means by which the tip may be readily and efficiently clamped in any adjusted position, and to provide such a means which will afford maximum support for the tip and increase the rigidity of its support.

A still further object is to provide a tip of relatively simple construction which can be clamped in place without undue danger of breakage, and which will require a minimum of regrinding to recondition it for use.

A still further object is to provide such a tool which will be rugged and durable, which may be conveniently and quickly adjusted and efficiently reground, and which will provide for use of a maximum proportion of the tip body before it need be replaced by a new tip.

A still further object is to provide a tip of this type which is so shaped as to be readily fabricated by the methods of powder metallurgy without grinding, and interchangeable without undue accuracy of dimensions.

The accompanying drawings illustrate, and the following specification describes, embodiments of the invention in a straight-shank tool for turning metal or the like, but it will be appreciated that the invention may be embodied in milling cutters and in tools of many other shapes and uses.

In the accompanying drawings:

Fig. is a fragmentary view in perspective showing the front end of a turning tool embodying the invention;

Fig. 2 is a view in front elevation of the tool shown in Fig. 1;

Fig. 3 is a fragmentary plan view partly in section of the tool shown in Fig. 1;

Fig. 4 is a view in vertical section taken on the line 4—4 of Fig. 3;

Fig. 5 is a view in horizontal section taken on the line 5—5 of Fig. 2;

Fig. 6 is a view in perspective of the disassembled tip and clamping member, respectively, shown in Figs. 1 to 5;

Fig. 7 is a fragmentary view in perspective showing the front end of a second embodiment of a turning tool embodying the invention.

Fig. 8 is a fragmentary plan view of the tool shown in Fig. 7;

Fig. 9 is a view in vertical section taken on the line 9—9 of Fig. 8;

Fig. 10 is a fragmentary sectional view partly in plan taken on line 10—10 of Fig. 9;

Fig. 11 is a fragmentary sectional view taken on the line 11—11 of Fig. 9; and

Fig. 12 is a view in perspective of the disassembled tip and clamping member, respectively, shown in Figs. 7 to 11.

In the embodiment illustrated in Figs. 1 to 7, the shank 11, of rectangular cross section and formed of steel or the like, is formed with a beveled side surface 12 near its front end to provide side clearance, with a beveled end surface 13 to provide end clearance, and with a top surface 14 that is sloped downwardly and laterally away from the cutting edge of the tip to correspond to the "side rake" of the tip. A channel recess is formed in the top portion of the shank, having a bottom surface 15 that is below and substantially parallel to the surface 14, a flat overhanging side wall surface 16 and a rear surface 17, which is preferably vertical. As shown, the overhanging side wall surface 16 may be conveniently provided by milling the channel with a side wall 18 perpendicular to the bottom wall or surface 15 and then brazing to such surface a member 19 of triangular cross-section, but it will be understood that the channel may be formed in the shank body, if desired, by the use of a beveled milling cutter, or otherwise, so that the overhanging portion on which the surface 16 is formed will be an integral part of the shank 11.

A groove 20 is formed in the shank 11, preferably by milling, and extends downwardly from the bottom surface 15 to intersect a bore 21 which is substantially closed at the front end of the shank by a plug 22 which is secured in place, as for instance by brazing, and has an opening 20a in extension of the groove 20.

A clamping member 23 is rotatably mounted in the bore 21, being generally cylindrical to fit the bore, but of only slightly more than a semi-circle in cross section, as shown, its flat upper face 24 meeting its flat lower face 25 substantially at its axis so that such faces form a dihedral angle of less than 180°, preferably about 160°. A bore 26 extends laterally from the side face 27 of the shank 11 which is opposite the cutting edge of the tool, that is to say, opposite to the side face of the shank on which the beveled side clearance surface 12 is formed. A clamping screw 28 is threaded in the bore 26, and is provided with an end portion 29 for engagement with the lower flat face 25 of the clamping member 23, such screw being preferably of such length as not to protrude from the side face of the shank. As shown, the screw 28 has a hexagonal recess to receive a hexagonal operating wrench, but it will be understood that a slotted screw or a screw of any other desired type may be used.

A bore 30 extends longitudinally of the shank 11 from the rear wall 17 of the channel recess and a stop screw or backing screw 31, having a hexagonal recess 32 in its forward end, is threaded therein.

A replaceable cutting tip or blank 33, formed of cemented carbide composition, is mounted in the channel recess of the shank 11, being slid into place from the front end of the shank. The tip 33 is formed with a flat top face 34, a flat bottom face 35 for engagement with the bottom surface 15 of the channel recess and a beveled face 36 for engagement with the overhanging surface 16 of the channel recess. A rib 37 projects downwardly from the flat bottom face 35, being received in the groove 20, and provides an abutment 38 for engagement by the edge 39 of the flat upper face 24 of the clamping member 23. The lower corner of the tip 33 is preferably relieved or rounded at 40 where the bottom face 35 and the beveled face 36 merge. The top and bottom faces 34 and 35 are preferably, although not necessarily, parallel. The rear face 41 of the tip 33 is preferably perpendicular to the top, bottom and beveled faces and to the rib 37. The rear portion 42 of the side face of the tip, opposite to the beveled face 36, is inclined relative to the top face 34 and the bottom face 35 so as to be substantially parallel to, but preferably spaced slightly outwardly from, the corresponding side face 12 of the shank 11. The forward portion of the tip 33 is tapered to provide a flat side face portion 43 which meets the top face 34 to form the cutting edge 44. The flat forward portion 43 of the side face is normally substantially parallel to, but preferably spaced slightly outwardly from, the beveled side surface 12 of the shank. The forward end of the tip is provided with a flat end face 45 that preferably is at an angle of substantially 84° relative to the cutting edge 44.

It will be evident that, when the screw 28 is retracted from the position shown, the tip 33 may be slid endwise until its rear face 41 engages the end of the stop screw or backing screw 31 as shown, whereupon rotation of the screw 28 against the lower flat face 25 of clamping member 23 will rotate such clamping member and force the upper edge 39 of the upper face 24 thereof against the abutment 38 of the rib 37 of the tip and thereby clamp the tip 33 laterally and downwardly upon its seat, both the direction of thrust of the edge 39 and the wedging engagement of the beveled face 36 of the tip against the overhanging face 16 of the shank having the effect of forcing the tip downwardly into engagement with its seat on the surface 15.

The general construction of the embodiment illustrated in Figs. 7 to 12, inclusive, is substantially the same as that of the embodiment shown in Figs. 1 to 6, but the abutment on the tip is provided in a groove instead of on a projecting rib, and a different clamping means is shown for engagement with such abutment.

In Figs. 7 to 12, a shank 11ª, having a beveled side surface 12ª, a beveled front surface 13ª and an inclined top surface 14ª, is formed with a channel recess in its top at its forward end, such recess having a bottom surface 15ª, an overhanging side wall 16ª and a rear surface 17ª. The overhanging side wall surface 16ª may be provided on a member 19ª of triangular cross section that is brazed to a surface 18ª of the shank. A bore 30ª extends rearwardly from the rear surface 17ª of the channel recess and a stop screw 31ª is threaded therein.

The tip 47 is formed with a flat top face 34ª, a flat bottom face 35ª for engagement with the bottom surface 15ª of the channel recess, a beveled face 36ª for engagement with the overhanging surface 16ª of the channel recess, and a rear face 41ª for engagement with stop screw 31ª. The rear portion 42ª of the side face of the tip 47 opposite to the beveled face 36ª is inclined relative to the top face 34ª and to the bottom face 35ª and normally is substantially parallel to and spaced slightly outwardly from the corresponding side face 12ª of the shank 11ª. The forward portion of the tip 47 is tapered and has a flat side face portion 43ª which meets the top face 34ª to form a cutting edge 44ª, such forward portion 43ª of the side face being substantially parallel to but spaced outwardly from the beveled side surface 12ª of the shank 11ª. The forward end of the tip 47 is provided with a flat end face 45ª that preferably is at an angle of slightly less than 90° to the cutting edge 44ª.

The tip 47 is provided with a groove 48 in its lower face 35ª to provide an abutment 49 that is substantially perpendicular to such face. A bore 50 extends laterally from the side of the shank opposite to that on which the beveled face 12ª is formed, and is inclined upwardly so that its axis is substantially parallel to the bottom surface 15ª of the channel recess, such bore 50 terminating in a surface 51. A clamping member 52 fits in the bore 50, being generally of cylindrical shape but having a flat intermediate surface 53 formed thereon to leave a terminal flange 54 which has a flat top surface 55. A screw 56 extends through the clamping member 52 so that its forward end may be engaged with the inner surface 51 of the bore 50 and thus retract the clamping member 52. It is preferable that neither the clamping member 52 nor its screw 56 project from the side face of the shank 11ª in normal clamping position. It will be apparent that when the screw 56 is retracted the clamping member may be moved slightly inwardly from the position shown in the drawings and the tip 47 may be slid endwise into position, the flange 54 fitting loosely in the groove 48. When the tip 47 is in proper position with its rear face engaging the stop screw 31ª the screw 56 is rotated into engagement with the surface 51 to thereby force the flange 54 into clamping engagement with the abutment 49 which constitutes one wall of the groove 48, so that the tip 47 will be wedged into tight engagement with the bottom surface 15ª of the channel recess.

It will be apparent that, with either of the embodiments shown, the tip may be readily and quickly removed or clamped in place, so that the tip may be replaced at will, with a tip of the same shape but of different composition or with a new tip, when necessary. It will also be apparent that when a tip has been worn on its cutting edge it may be readily and quickly removed and replaced and clamped in a slightly advanced position after the stop screw has been properly adjusted, and may then be reground on its side cutting face 43 or 43ª and its end cutting face 45 or 45ª without any danger of engagement of the grinding wheel with the steel of the shank, which engagement would cause clogging and fouling of the grinding wheel with steel particles with resultant overheating and injury of the tip. It is usually desirable that the lateral spacing of the side cutting face 43 or 43ª of the tip from the beveled face 12 or 12ª be kept the same. It will also be apparent that, with the dimensions and angles as shown, even when the tip has been repeatedly adjusted and reground until over two thirds of the tip has been removed, the remaining portion of the tip will be securely and effectively held by the clamping means, and that under all conditions the tip will be tightly and rigidly supported on the base.

As pointed out heretofore the clamping means is operable from a side of the base remote from the cutting edge 44 or 44ª of the tip, so that it can not be engaged by the chips. It will be understood that while the chips primarily engage the top surface 34 or 34ª of the tip they tend to curl or otherwise move into the space between the work and the beveled face 12 or 12ª, and into the space between the work and the end face 13 or 13ª of the shank. With the construction shown fouling of the clamp-operating means by the chips is entirely precluded.

It also will be apparent that the tips illustrated are of simple construction and may be readily and economically fabricated by the usual processes of powder metallurgy, and with surfaces sufficiently near true planes, without grinding, and that the design of the tool and clamping means is such as to render unnecessary extreme accuracy of dimensions.

It will also be understood that the principles and novel features of the invention are not limited to the embodiments shown but may be applied to milling cutters having one or more inserted tips and to other cutting tools for many different uses and of widely different construction.

What is claimed is:

1. A cutting tool comprising a base having a recess therein, said recess having a bottom surface and a side surface, a cutting member having a bottom surface and a side surface engaging the bottom surface and the side surface of the recess in said base, respectively, and adjustable lengthwise of said recess, said cutting member having an abutment on its lower portion, an element carried by said base below said cutting member and movable toward said abutment in the same general direction as the cutting force imposed upon said cutting member when in use, and means for operating said element to clamp said cutting member against said side wall of said base in any adjusted position thereof longitudinally of said base.

2. A cutting tool comprising a base having a recess therein, said recess having a flat bottom surface and a flat side surface together defining a guiding channel, a cutting member having surfaces engaging said flat surfaces of said recess and having an abutment surface on its lower portion substantially equidistant from said side surface of said cutting member at all points lengthwise of said cutting member, and means carried by said base below said cutting member and operable toward said abutment to clamp said cutting member against said side surface of the recess in said base.

3. A cutting tool comprising a base having a recess therein, said recess having a bottom surface and a side surface, a cutting member positioned in said recess having a cutting edge and a bottom surface and a side surface remote from said cutting edge, the bottom portion of said cutting member being formed with an abutment, and means operable from a surface of said base remote from said cutting edge and cooperating with said abutment for clamping the bottom and side surfaces of said cutting member toward bottom and side surfaces of said recess.

4. A cutting tool comprising a base having a recess therein, said recess having a bottom surface and a side surface, a cutting member having a bottom face and a side face and beveled to provide a cutting edge at an angle to and opposite to said side face, said member having an abutment intersecting the bottom face of said member at a line parallel to said side face of said member, whereby said member is adjustable longitudinally of said recess, and clamping means cooperating with said abutment for forcing said cutting member against the bottom and side walls of said recess in any adjusted position.

5. A cutting tool comprising a base having a recess therein, said recess having a bottom wall and a side wall together defining a guiding channel, a cutting member adjustable lengthwise of said channel and having a cutting edge and having an abutment on a side thereof remote from said cutting edge, a clamping member rotatably mounted in said base and having an edge engaging said abutment, and means for rotating said clamping member to clamp said member in adjusted position.

6. A cutting tool comprising a base having a recess therein, said recess having a bottom surface and a side surface together defining a guiding channel, a cutting member having a bottom face and a side face engaging the bottom surface and side surface of said recess, respectively, and having a cutting edge and an abutment face on its bottom portion, a clamping member rotatably mounted in said base and having an edge engaging said abutment face, and means for rotating said clamping member to clamp said cutting member in adjusted position, the axis of rotation of said clamping member being in a plane perpendicular to said bottom face which is laterally spaced toward said cutting edge from the plane perpendicular to said bottom face through the line of engagement of the edge of said clamping member with said abutment face of said cutting member.

7. A cutting tool comprising a base having a recess therein, said recess having a bottom wall and a side wall together defining a guiding channel, a cutting member having a bottom face and a side face engaging said walls of said recess, whereby said cutting member is adjustable lengthwise of said recess, said cutting member having a cutting edge remote from said bottom face and said side face and having a longitudinally extending abutment substantially perpendicular to said bottom face, said base having an opening therein below and extending transversely of and substantially parallel to said bottom surface of said recess, a clamping member fitting in said opening and having a projection thereon engaging said abutment, and means carried by said clamping member and engaging the inner end of said opening to force said clamping member laterally relative to said cutting member.

8. A cutting tool comprising a shank of substantially rectangular shape in cross section beveled at its front end to form a side-clearance surface and having a recess intersecting said surface, a cutting member adjustably positioned in said recess and having a cutting edge at an angle to its direction of adjustment, said cutting member having an abutment thereon substantially perpendicular to its lower face, and means cooperating with said abutment and operable from a side of said shank remote from said cutting edge for clamping said cutting member in adjusted position in said recess.

9. A cutting tool comprising a shank of substantially rectangular shape in cross section, said shank having a recess in its upper surface at one end, a cutting member adjustably positioned in said recess and having a cutting edge and an abutment remote from said cutting edge, a clamping member rotatably mounted in said shank below said cutting member and having an edge engaging said abutment, and means operable from a side of said shank remote from said cutting edge for rotating said clamping member to clamp said cutting member in adjusted position.

10. A cutting tool comprising a shank of substantially rectangular shape in cross section, said shank having a recess in its upper surface at one end, a cutting member adjustably positioned in said recess and having a top face and a side face intersecting to form a cutting edge and an abutment on its lower portion remote from said cutting edge, a clamping member mounted in said shank below said cutting member and having a projection engageable with said abutment, and means for forcing said clamping member laterally of said shank to clamp said cutting member in adjusted position.

11. A cutting member having a top face, a bottom face substantially parallel to said top face, a flat side face forming an acute angle with said bottom face, a second side face opposite to said first mentioned side face comprising a rear portion forming an acute angle with said top face to define a cutting edge that is inclined laterally from the line of intersection of said rear portion of said side face and said top face, and an abutment face extending longitudinally of said cutting member and intersecting and substantially perpendicular to said bottom face.

PHILIP M. McKENNA.